May 28, 1963  J. R. HUET  3,091,155
METHOD OF OBTAINING COLOURED IMAGES
Filed March 1, 1961  2 Sheets-Sheet 1
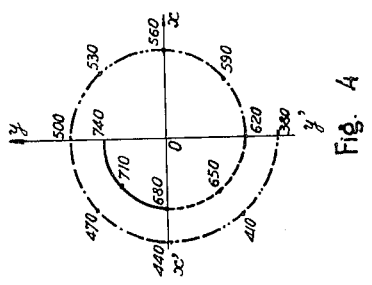
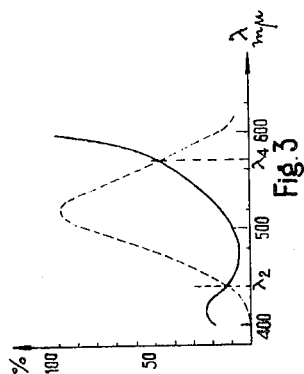
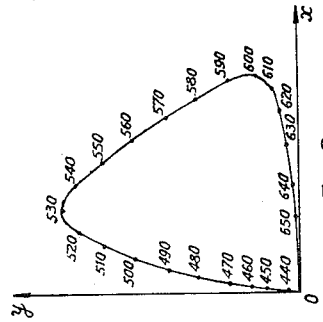
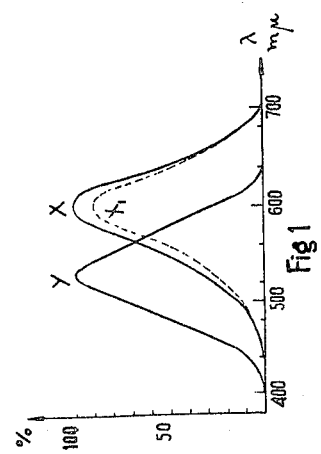
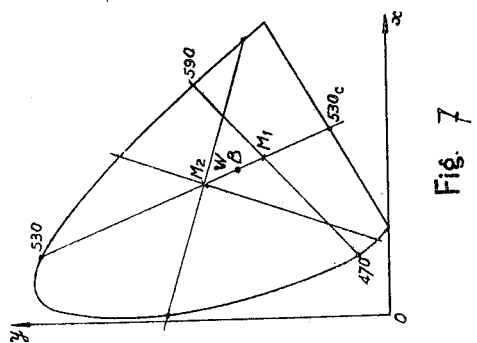
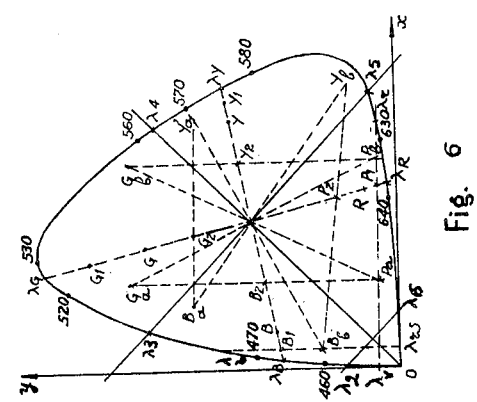
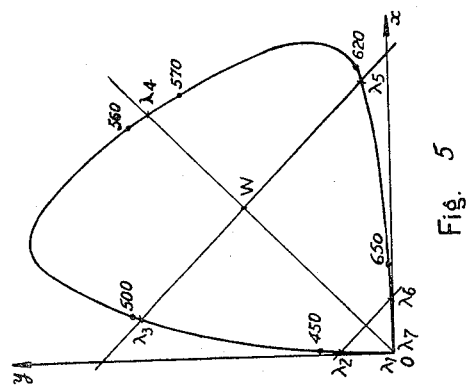
INVENTOR
Jean R. HUET
BY
ATTORNEYS May 28, 1963 J. R. HUET 3,091,155
METHOD OF OBTAINING COLOURED IMAGES
Filed March 1, 1961 2 Sheets-Sheet 2

Inventor
JEAN HUET
By
attorneys

United States Patent Office 3,091,155
Patented May 28, 1963

3,091,155
METHOD OF OBTAINING COLOURED IMAGES
Jean Robert Huet, 41 Rue de Richelieu,
Paris I, France
Filed Mar. 1, 1961, Ser. No. 92,571
8 Claims. (Cl. 88—16.4)

This invention relates to an improved method of obtaining colored images of the additive type, and is more particularly applicable to simultaneous-sequential or sequential processes of cinematography and television, as will be described hereinafter.

This application in part discloses and claims subject matter disclosed in applicant's earlier copending application Serial No. 775,152, filed November 20, 1958, now abandoned.

Whether the reproduction of colours be achieved by photo-chemical or electronic means, it is an accepted fact that all hues can be reproduced with three colour components; one might, however, either for technical or merely practical reasons, prefer to adopt an even number of elementary images. If we assume a four colour analysis and synthesis of white light, whenever the elementary colour records be registered and projected, or the elementary signals transmitted, simultaneously, the system will be said to be simultaneous; in a sequential system, on the other hand, the elementary colour records will be registered and projected, or the elementary signals transmitted, in succession; whereas a system will be labelled simultaneous-sequential whenever the elementary colour images are grouped in pairs registered and projected successively, each pair at a time, or when comprising a succession of pair-wise assorted elementary colour components such as lines or dots, simultaneously recorded or transmitted, which will vary in a cyclic manner.

In both the sequential and simultaneous-sequential colour systems, the standard image repetition rates adopted for black and white cinematography or television have been found too slow for the individual stimuli to blend satisfactorily, so that there appears such flaws as flicker, colour pulsation and colour fringes due to time-parallax. A remedy of these defects has been sought by an increase in the image repetition rate, or signal frequency: this appears to be reasonable but a notable though not entirely conclusive improvement can be derived from such a modus operandi. Anyhow, the adoption of this stratagem would necessarily entail costly technical complications and render obsolete most standard black and white equipment.

Certain experiments, however, and the deductions therefrom have tended to show that better results may be obtained without recourse to this obvious method.

In carrying out the present invention, as applied to cinematography, standard cameras and projectors are used, fitted with suitable lenses and operating at usual black and white speed; developing and printing being carried out in the normal way; the invention is achieved, briefly, by means of a particular selection of the component colors of four elementary images which may be associated in pairs, each component color being obtained by addition of one or more than one so-called "secondary" color to a "primary" or to a "substituted color," as will be described hereinafter. These component colors are such that the images obtained on the screen have a greater luminance factor than those obtained by similar systems known to date, whilst the aforementioned flaws are eliminated.

In order that this invention may be more clearly understood, I shall proceed to describe the same with reference to the accompanying drawings, in which:

FIGURE 1 shows scotopic Y and foveal photopic X visibility curves for the arc-light spectrum (data from Abney), which acceptedly represent the relative spectral sensitivity of rods and cones, respectively.

FIGURE 2 is a colour diagram expressing the spectral locus in terms of two receptors having the sensitivities of the rods and the cones as depicted by the scotopic and foveal photopic visibility curves determined by Abney for the arc-light spectrum. Ordinates: the ordinates of curve Y, FIG. 1, the scotopic visibility curve. Abcissae: the ordinates of curve $X_1$, FIG. 1, the foveal photopic curve reduced to an area equal to that enclosed by the scotopic curve.

FIGURE 3 designates by the full line a curve showing the relative bleaching capacities of different wave-lengths, as determined by their effect on the size of the $b$-wave, together with the absorption curve (dotted line) of visual purple as accumulated in darkness by the rod system, calculated from electro-physiological data.

FIG. 4 shows a diagram of colour repartition in accordance with the invention.

FIG. 5 reproduces the diagram given in FIG. 2 and shows the division of the said diagram into several sections according to this invention.

FIG. 6 shows the position on the said diagram of the points representing the constituent colours to be used according to this invention, and FIG. 7 shows the position, on the International Commission of Illumination diagram, of points representing certain additive colour mixtures.

Figure 8:
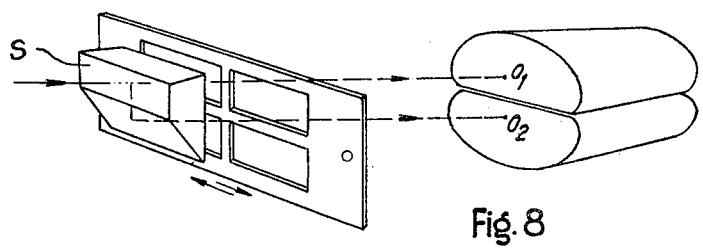
FIGURE 8 is a perspective view of a filter unit which can be adapted to a taking camera and used in connection with a beam splitter S and dual lenses $O_1O_2$.
Figure 9:
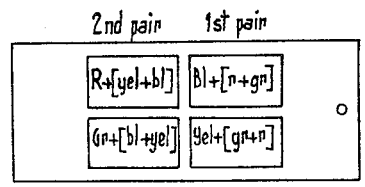
FIGURE 9 is a front elevation of said filter unit comprising four elements with each element consisting of a homogeneous color filter.
Figure 10:
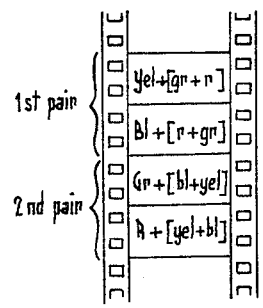
FIGURE 10 shows a short length of positive film with each elementary picture frame of said filter being covered with a homogeneous coating or homogeneous coatings of dyes, or lacquers, corresponding to each of the four complex component colors of the taking filters and constituting a second type of filter unit employed for the reproduction of colors at the projecting stage.
Figure 11:
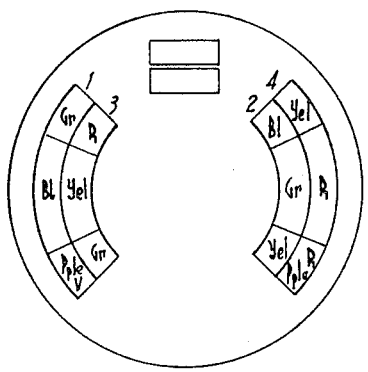

FIGURE 11 shows a third type of filter unit, which is a rotating disc and can be adapted to a taking camera with each of the four filter elements consisting of three sectors, the central sectors corresponding to the fundamental constituent colors and the side sectors to the subsidiary constituent colors and such a filter unit could be used for projection, instead of colored dyes coating the elementary images.

Figure 12:
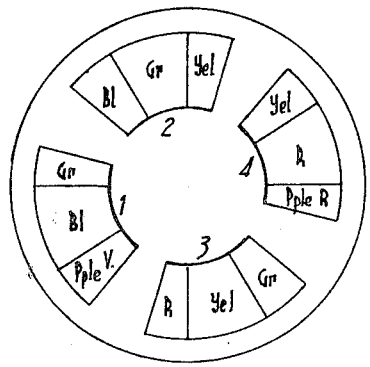

FIGURE 12 shows a fourth type of filter unit, consisting of a rotating disc which can be adapted to a printing machine in order to operate the four color analysis at the printing stage, starting with color images of the subtractive type, each color image being printed twice in order to obtain the necessary pairs of associated elementary images corresponding to approximately complementary complex component colors.

In three colour systems for the reproduction of colours, the component colours used approximate the trichromatic primaries, namely the blue, green and red radiation bands, each one covering one third of the visible spectrum, and extending respectively over the 400—500, 500—600 and 600—700 millimicron bands. The spectral distribution curves of these primaries are close to those which represent the relative spectral sensitivities of the three colour receptors which, in accordance with the Helmholtz-Young theory, are supposed to be part of the human retina and through the medium of which the colour sensations are supposed to take place. In a four colour system, it is common practice to divide the same 400–700 m$\mu$ portion of the spectrum into four equal bands, the elementary colours being then: blue (400–475), green (475–550), yellow (550–625) and red (625–700 m$\mu$).

In both the sequential and simultaneous-sequential systems, whether based on a three of four colour selection, contrarily to what happens in black and white projection or in a simultaneous system of colour reproduction, the individual stimuli received by the different chromatic receptors are dissimilar by consecutive projection time units; these receptors further react differently to intermittent excitations and to different wave-lengths. Hence the appearance of flicker and colour pulsation on the screen. The existence and the importance of these phenomena being linked to the stimulation frequency, it was thus an obvious step to resort to an increase in the image repetition rate as a remedy, in order to comply with the experimentally established physiological laws applying to the persistency of vision and the fusion of the elementary chromatic stimuli.

As hereinbefore mentioned, the main object of this invention is to avoid the extremely inconvenient acceleration. This object is achieved by means of an original chromatic selection. Its effect is to provoke upon the retina, by each projection time-unit, stimulations which are balanced in such a way that, though being intermittent and discrepant, they elicit a continuous response from the chromatic receptors, whilst, at the same time, a definite contrast is maintained between the sensations evoked, sufficient for the colours seen on the screen not to appear unduly desaturated.

Although experiments of colour mixing provide results which can be interpreted in terms of the activities of the hypothetical three components of the colour receiving process, the derivation of three fundamental sensation curves by no means proves that such curves exist: they are mathematical conceptions and do not correspond to anything that can be recorded from the optic nerve fibres; there is no evidence as yet from structural data of the existence in the retina of three types of receptors, as set forth in the Helmholtz-Young theory; whereas the existence of two main sets of sensory elements is well established. These receptor cells, namely the rods and the cones, respond each in different degrees to all wavelengths of the visible spectrum, thus fulfilling the minimum requirements for discrimination of intensity and wave length, and affording a mechanism by which all the spectral colours can be appreciated; which by no means questions the fact that a third factor must necessarily be involved in colour vision to account for all the phenomena associated with colour mixture. This third factor might be visual purple.

It seems probable that the spectral sensitivity of the rods and cones can be represented with more or less accuracy by the scotopic and photopic visibility curves shown in FIG. 1. On the basis of these cuurves, it has been possible to construct the diagram shown in FIG. 2. It is further established that there is an obvious resemblance between the scotopic visibility curve and the absorption spectrum of visual purple, shown in FIG. 3, together with a curve depicting how the bleaching of this substance by light is affected by variations of wavelength. These two curves present two intersecting points in the neighborhood of wavelengths 440 and 560 m$\mu$.

In order to distribute the colours into four groups, the invention uses an original graphic representation constructed, as shown in FIG. 4, by plotting wavelengths equiangularly round a spiral, and orienting the wavelengths 440 and 560 m$\mu$ so as to lie on the $x$ axis; thus the wavelengths points 380 m$\mu$ (taken as the lower limit of the visible spectrum) and 740 m$\mu$ (taken as its upper limit) are found on the $y$ axis, as well as the wavelengths points 500 and 620 m$\mu$. The colours corresponding to the four quadrants then constituting the four groups, namely:

(1) Blue (440–500 m$\mu$ and dark red (680–740 m$\mu$)
(2)           Green (500–560 m$\mu$)
(3)           Yellow (560–620 m$\mu$)
(4) Red (620–680 m$\mu$) and violet (380–440 m$\mu$)

This colour repartition may be transposed on the chromatic diagram representing the spectral locus as a function of the sensitivity of the rods and the cones, as shown in FIG. 5: By drawing two rectangular diagonals intersecting at the neutral point W having as coordinates $x=40$, $y=40$, one of these diagonals being OW. The points representing the wavelengths: $\lambda_1=380$ m$\mu$ and $\lambda_7=740$ m$\mu$, coincide with the origin of the coordinates 0, as representing the limits of the visible radiations. The two diagonals further intersect the spectral locus at the points representing the following wavelengths:

$$\lambda_3\ 500\ \text{m}\mu,\ \lambda_4\ 560\ \text{m}\mu,\ \lambda_5\ 620\ \text{m}\mu$$

by drawing a second line perpendicular to OW, and intersecting the spectral locus at points representing the wavelengths:

$$\lambda_2\ 440\ \text{m}\mu,\ \lambda_6\ 680\ \text{m}\mu$$

Each of the elementary colours of the system will be selected so that its dominant wavelength belongs to one of the four blue, green, yellow or red bands as defined above. The points representing these colours will be found within one of the four sectors having W for an apex and determined by the spectral locus and the two rectangular diagonals. The additive mixture of these four colours must necessarily reproduce white; these four colours can be associated in pairs which are very nearly complementary, i.e. pairs taken in groups 1 and 3 on the one side, 2 and 4 on the other side. The luminances of each associated pair of colours will have to be the same, that is to say that:

$$L_B+L_Y=L_G+L_R,\ L_B,\ L_Y,\ L_G,\ L_R$$

representing the luminances of these four elementary colours. Their selection will be made so that the sums of the excitations provoked on one hand on the cones, and on the other hand on the rods by the colours of each pair are equal, that is to say that the coordinates of the points representing these four colours in the diagram FIG. 5 satisfy the relations:

$$x_B+x_Y=x_G+x_R$$
and
$$y_B+y_Y=y_G+y_R$$

As an example, a colour system, as shown in FIG. 6, could be composed of elementary colours having the following coordinates:

First pair B:
    $x_B=10$                                      $x_Y=70$
    $y_B=30$ and $Y$                   $y_Y=50$
Second pair G:
    $x_G=35$                                      $x_R=45$
    $y_G=72.5$ and $R$                $y_R=7.5$ The dominant wavelengths of the elementary colours thus selected appear clearly on the diagram. In this particular case:

$$460\ \text{m}\mu<\lambda_B<470\ \text{m}\mu$$
$$520\ \text{m}\mu<\lambda_G<530\ \text{m}\mu$$
$$570\ \text{m}\mu<\lambda_Y<580\ \text{m}\mu$$
$$630\ \text{m}\mu<\lambda_R<640\ \text{m}\mu$$

The spectral colours corresponding to the dominant wavelengths of the selected elementary colours being the primaries of the system.

But the green primary colour $\lambda_G$ has as its complementary a purple which may be considered as an additive mixture of spectral violet $\lambda_V$ such that $380\ \text{m}\mu<\lambda_V<440\ \text{m}\mu$, and of spectral red $\lambda_R$ such that $620\ \text{m}\mu<\lambda_R<680\ \text{m}\mu$, these two spectral colours being mixed in such proportions that the point $P_1$ representing the mixture lies on the straight line GR. According to this invention, the red primary colour will be replaced by the colour $P_1$ which will therefore be known as a "substituted" colour, the latter to be considered as the essential element in the process of concretizing one of the four component colours of the system.

By analogy, one could mix spectral blue of wavelength $\lambda_c$ such that $440 \text{ m}\mu < \lambda_c < 500 \text{ m}\mu$, and dark red of wavelength $\lambda_{dr}$ such that $680 \text{ m}\mu < \lambda_{dr} < 740 \text{ m}\mu$, these two spectral colours being mixed in such proportions that the point $B_1$ representing the mixture lies on the straight line BY. The blue spectral primary could be replaced by the colour BI, which will hereinafter be known as the "substituted" blue colour, the said substituted colour being used as the essential element of the blue component in the system.

Such colours as those represented by the points B, G, Y and R could be concretized in several different ways: for instance, they could be considered as spectral colours desaturated by the addition of white light. In actual practice, and within the scope of this invention, the component colours of the system are obtained, starting with primary or substituted colours, by addition of so-called "secondary" colours, which shall be: (1) taken from among the colours of the other pair, (2) of wavelengths approximately complementary to each other, (3) of such intensities that their addition yields colourless light, or, in the case where a chromatic correction be called for, of such intensities that their addition modifies the hues of the primaries (for instance in the case where the said primaries are not rigorously complementary). This addition of secondary colours has a double effect: firstly, it increases noticeably the luminosity of the projected images, and—secondly, it enhances, by each projection time-unit, the excitation of those of the chromatic receptors which would otherwise not have been noticeably or sufficiently stimulated by the primaries alone, thus eliciting enough response from the said receptors to evoke permanent coloured sensations. It does not follow that the colours perceived become unduly desaturated as those colours complementary to each primary, or substituted colour, have been banished from the respective colour mixtures when addition was made of secondary colours. It is further essential, as far as the additions of secondary colours are concerned, to effect them so as to obtain equal luminances for each pair of associated component colours, and to provoke balanced excitations of the cones and the rods. Besides, the additive mixture of the whole set of component colours must obviously reproduce white light.

FIG. 6 illustrates such a formation of a definite set of component colours B, G, Y and R by means of adding secondary colours to primary or substituted colours: to the colours $B_1$ and $Y_1$, on one hand, and to $G_1$ and $P_1$, on the other hand, are respectively added as secondary colours certain quantities of G and R, or $G_1$ and $P_1$, on the one hand, and of B and Y, or $B_1$ and $Y_1$, on the other hand, in such proportions that in each case the point representing the mixture of the secondaries is W.

One could also use a secondary colour, for instance, a mixture of:

$G_a$ and $P_a$ represented by $B_2$
$G_b$ and $P_b$ represented by $Y_2$
$B_a$ and $Y_a$ represented by $G_2$
$B_b$ and $Y_b$ represented by $P_2$ $G_b$ and $P_b$ being respectively complementary to $P_a$ and $G_a$,
$B_b$ and $Y_b$ being respectively complementary to $Y_a$ and $B_a$.

The component colurs B and Y, G and R are then obtained by mixing in proper proportions $B_1$ and $B_2$, $Y_1$ and $Y_2$, $G_1$ and $G_2$, $P_1$ and $P_2$.

It may happen that a chromatic correction of the mixture of associated primaries is desirable: for instance, let us take a case in which the one pair of selected primaries would have as dominant wavelengths 470 and 590 m$\mu$ which are not rigorously complementary by I.C.I. white light B, which is supposed to be used as illuminant in this example, and represented by point $W_B$. These two primaries are mixed in such proportions that their additive mixture is represented by $M_1$, which happens to be on the straight line joining the points representing wavelength 530 and its complementary in white light B, namely $530_c$. To this mixture $M_1$, as far as secondary colours are concerned, could be added green 530 m$\mu$, and purple $530_c$ in such proportions that the mixture could be represented by $M_2$ and in such quantities that the point representing the final mixture be $W_B$.

In the example given hereinbefore, secondary colours have been added to each of the associated primary colours. These additions may be distributed with a certain leeway but in extreme cases secondary colours, or one secondary colour, would be added only to one primary in a given pair.

It has been given that the spectrum of each primary or substituted colour covers at most one or two radiation bands each of which is spread over approximately one-sixth of the portion of spectrum from 380 to 740 m$\mu$. The same is true for each secondary colour. The spectrum of each component colour can therefore cover up to two-thirds or five-fifths of the visible spectrum.

The four colour selection in accordance with this invention can be put into practice in different ways. Thus in cinematography with a simultaneous-sequential system, the negative pictures could be registered upon usual panchromatic film-stock in a standard camera fitted with twin lenses, sawn off if necessary, with a beam splitter and also with an oscillating or rotating filter-holder; the analysis of white light woulld then take place by means of adequate filters: each one, either comprising a plurality of sections corresponding to the respective transmittances of the primary (or substituted) and secondary colours, or being homogeneous and having the overall transmittance of one of the four component colours, according to the inventive steps of the invention; each pair of associated elementary images would then be simultaneously recorded within one standard picture-frame; each elementary image could have nearly the width and half the height of a standard picture, these two dimensions being thus related to each other in a ratio between 1.75/1 and 2.5/1, most suitable for projection upon so-called "wide" or "panoramic" screens; then with negative film reels developed and printed in the usual way, the positive pictures could be covered with homogeneous coatings of dyes corresponding to the four component colours according to the inventive steps of this invention; moreover, projection would be performed by means of standard projectors fitted with twin lenses which allow the superimposition on the screen of the associated elementary images.

Alternatively, such positive pictures could be obtained, starting with images of the subtractive type, registered for instance on usual three emulsion layered film stock; instead of taking place at the recording stage, the analysis of white light according to this invention would then be operated by means of an optical printer in either one or the other of the following manners: starting with positive colour pictures of the subtractive type, a duplicate negative reel could be obtained on black and white film stock, the optical printer being fitted with suitable filters mounted in a mobile filter holder, such filters corresponding to the four component colours according to this invention, as described hereinbefore; each colour picture would be printed twice, each odd numbered picture being for instance printed successively by passing light through light analysing means with the interposition of filters corresponding to the blue and yellow component colours, whereas from the even numbered pictures of the colour reel would be similarly printed the duplicate negative images corresponding to the green and purple red component colours, or vice versa; each pair of twin images should be registered in juxtaposition within one standard picture frame, the optical printing being therefore eventually operated with cylindrical lenses allowing if necessary a reduction of size; developing the duplicate negative reel and positive printing therefrom would subsequently take place in the usual way; the positive pictures could then be covered with homogeneous coatings of dyes and projection would be performed as hereinbefore stipulated;—starting with a negative reel of the subtractive type, positive prints could be directly obtained on black and white film stock by passing light through light analysing means with the interposition of filters corresponding to a selection of colours complementary to the four component colours according to this invention; the modus operandi remaining otherwise similar to that hereinbefore described.

Needless to say, other modifications using equivalent techniques could be adopted; thus in cinematography by magnetic-method, the radiation bands corresponding to the component colours of the elementary images would then be selected by appropriate means.

The application to television can be achieved in various manner, all characterized by: (a) the sequential transmission of four signals; or two pairs of associated signals, corresponding to the necessary selection of component colours according to the inventive steps of this invention; (b) the reception of the said signals, involving the reproduction of the same set of colours. The signals corresponding to the associated component colours in each one of the given pairs, colours which could be very nearly complementary, could be synchronized so that they may be transmitted either simultaneously or sequentially, the scanning of the corresponding elementary areas of the transmitting and receiving tubes being effected in the same manner. This could be operated, as an example, by passing light through light-polarizing and/or light analysing means with the interposition of a plurality of filters (either mobile or stationary), in combination with one, two, or two pairs of electron beams, modulated by (the) light after passing through the appropriate filters in the transmitter, on one side, and by the incoming synchronized electromagnetic signals in the receiver, on the other side. (Alternatively), the reproduction of colours could eventually be operated by means of coloured elementary particles incorporated in the receiving fluorescent screen. The desired result could be obtained in another way at the receiving end, by using solid or liquid mirrors and/or lenses in order to project elementary images unto a cinematographic screen, either successively or in simultaneous-sequential relationship. Such transmission and reception of elementary signals could be operated at frame or line frequency. It would also be feasible to use the odd lines of an interlaced frame for one set of associated component colours, and the even lines for the other set.

In any case, the spectral characteristics of the filters, either at the transmitting or receiving end, as well as those of the elementary particles eventually incorporated in the receiving fluorescent screen, would correspond to the necessary selection of component colours according to the inventive steps of this invention, which takes into account the natural response of rods and cones in the retina to the differently coloured impulses in order to ensure balanced stimulations of the eye by the constituent images of an additive projection, whether simultaneous-sequential or sequential. Should the system be simultaneous-sequential, such balanced stimulations are achieved as hereinbefore stated. Should the system be sequential, such balanced stimulations are achieved when the intensities of the component colours (or, of the component coloured beams of light) are such that the luminances of the blue and purple-red images on one hand, green and yellow on the other hand, be equal or respectively equal in pairs, that is to say that one should have:

Either $L_B = L_G = L_Y = L_R$

Or $\begin{cases} L_B = L_R \\ L_G = L_Y \end{cases}$

In the latter case, as well as in the case of a simultaneous-seq. method, the luminances of the yellow and green light impulses (considered as chromatically characterized luminance impulses), could attain or even surpass two-thirds of that of white light, whereas the luminance of the blue and purple-red light impulses (considered as complementary chromaticity impulses) would eventually attain or even surpass one third of that of white light. Furthermore, the stimulations provoked either on the cones or on the rods by the component coloured beams of light should be equal in pairs.

Telecinema transmissions could be operated by using a positive print obtained on black and white film material by either one or the other of the two methods as hereinbefore described, and projecting it into the lens of a television camera; at the receiving end, projection onto a cinematographic screen could be performed in the same way as in the case of a direct television transmission.

I claim:

1. A four color process in which elementary images are produced at the standard black and white repetition rate, said process consisting in segregating an incoming beam of white light into four separate complex color components, interposing a first color filter and a second color filter simultaneously into the path of the white light to produce two adjacent color images in a picture space, thereafter interposing a third color filter and a fourth color filter simultaneously into the beam of white light to produce two adjacent color images in an adjacent picture space, repeating the aforementioned interposing of the said pairs of color filters into the beam of white light, the four color filters each being homogeneous and having light transmitting characteristics corresponding to complex color components determined as follows: the visible radiations taken as extending from 380–740 m$\mu$ being distributed into four groups, namely, a first group comprising the blue (440–500 m$\mu$) and dark red (680–740 m$\mu$) bands, a second group comprising the green (500–560 m$\mu$) band, a third group comprising the yellow (560–620 m$\mu$) band and a fourth group comprising the red (620–680 m$\mu$) and violet (380–440 m$\mu$) bands, each said complex color component built on fundamental color constituents consisting of the additive mixture of one fundamental constituent color with said color belonging to one of the four aforementioned groups and at least one subsidiary constituent color, said subsidiary color being added to each of said fundamental constituents of the filter and being from one of the two groups nect to the group to which said fundamental constituent belongs, with exclusion of the opposite group containing the color which is complementary to said fundamental constituent color, said first and second mentioned filters corresponding to complex color components from groups one and three and the third and fourth filters corresponding to complex color components from groups two and four.

2. A four color process as claimed in claim 1 wherein said filters each have a plurality of sectors with each sector corresponding to one of the constituent colors.

3. A four color cinematographic process of the additive type in which elementary images are recorded on panchromatic black and white film material at the standard black and white repetition rate, said process consisting in segregating a beam of white light into four separate complex color components, interposing a color filter and a second color filter simultaneously into the path of the white light to produce two adjacent color images in a single standard picture frame on the film material, thereafter interposing a third color filter and a fourth color filter simultaneously into the beam of white light to produce two adjacent color images in an adjacent single standard picture frame on the film material, repeating the aforementioned interposing of the said pairs of color filters into the beam of white light on alternate frames, the four color filters each being homogeneous and having light transmitting characteristics corresponding to complex color components determined as follows: the visible radiations taken as extending from 380–740 mµ being distributed into four groups, namely, a first group comprising the blue (440–500 mµ) and dark red (680–740 mµ) bands, a second group comprising the green (500–560 mµ) band, a third group comprising the yellow (560–620 mµ) band and a fourth group comprising the red (620–680 mµ) and violet (380–440 mµ) bands, each said complex color component consisting of the additive mixture of one fundamental constituent color with said color belonging to one of the four aforementioned groups and at least one subsidiary constituent color, said subsidary color being added to each of said fundamental constituents of the filter and being from one of the two groups next to the group to which said fundamental constituent belongs, with the exclusion of the opposite group containing the color which is complementary to said fundamental constituent color, said first and second mentioned filters corresponding to complex color components from groups one and three and the third and fourth filters corresponding to complex color components from groups two and four.

4. A four color cinematographic process as claimed in claim 3, and printing positive pictures upon black and white film material from said simultaneously recorded images, applying homogeneous coatings of dyes to the separate images of the positive pictures on said film thereby producing filters with the colorimetric characteristics of said dyes corresponding to said four complex color components with the spectral energy distribution of the illuminant being taken into consideration, and projecting said positive pictures at standard black and white repetition rate in superimposed relationship by passing light through said colored filters for the purpose of additively reproducing colored pictures.

5. A four color cinematographic process of the additive type in which elementary images are recorded on a negative reel on black and white film material, said process consisting in recording the negative elementary images from positive images of the subtractive type in successive pairs on the film material, recording each pair of images in juxtaposition within one standard picture frame, segregating the incoming white light for obtaining separate and differentiated elementary images by means of a printing machine having a filter unit comprising four elements, the colorimetric characteristics of the four beams of light emerging from the four filter elements corresponding to four complex color components, with each complex color component determined as follows: the visible radiations taken as extending from 380–740 mµ being distributed into four groups, namely, a first group comprising the blue (440–500 mµ) and dark red (680–740 mµ) bands, a second group comprising the green (500–560 mµ) band, a third group comprising the yellow (560–620 mµ) band, and a fourth group comprising the red (620–680 mµ) and violet (380–440 mµ) bands, each said complex color component consisting of the additive mixture of one fundamental constituent color with said color belonging to one of the four aforementioned groups and at least one subsidiary constituent color, said subsidiary color being added to each of said fundamental constituents of the filter and being from one of the two groups next to the group to which said fundamental constituent belongs, with the exclusion of the opposite group containing the color which is complementary to said fundamental constituent color.

6. A four color cinematographic process as claimed in claim 5 wherein said filter unit consists of four elements each having a plurality of sectors with each sector corresponding to one of the constituent colors.

7. A four color cinematographic process of the additive type in which elementary images are recorded on black and white positive film material, said process consisting in recording positive elementary images from negative elementary images of the subtractive type in successive pairs on the film material, recording each pair of images in juxtaposition within one standard picture frame, segregating the incoming white light for obtaining separate and differentiated elementary images by means of a printing machine having a filter unit comprising four elements, the colorimetric characteristics of the four beams of light emerging from the four filter elements corresponding to four colors respectively complementary to four complex color components, with each complex color component determined as follows: the visible radiations taken as extending from 380–740 mµ being distributed into four groups, namely, a first group comprising the blue (440–500 mµ) and dark red (680–740 mµ) bands, a second group comprising the green (500–560 mµ) band, a third group comprising the yellow (560–620 mµ) band, and a fourth group comprising the red (620–680 mµ) and violet (380–440 mµ) bands, each said complex color component consisting of the additive mixture of one fundamental constituent color with said color belonging to one of the four aforementioned groups and at least one subsidiary constituent color, said subsidiary color being added to each of said fundamental constituents of the filter and being from one of the two groups next to the group to which said fundamental constituent belongs, with the exclusion of the opposite group containing the color which is complementary to said fundamental constituent color.

8. A four color cinematographic process as claimed in claim 7 wherein said filter unit consists of four elements each having a plurality of sectors with each sector corresponding to a color complementary to one of the constituent colors.

References Cited in the file of this patent

UNITED STATES PATENTS

| | | |
|---|---|---|
| 1,278,162 | Kelley | Sept. 10, 1918 |
| 1,278,302 | Campbell | Sept. 10, 1918 |
| 1,325,279 | Douglass | Dec. 16, 1919 |
| 1,607,593 | O'Grady | Nov. 16, 1926 |
| 2,221,037 | Yule | Nov. 12, 1940 |
| 2,465,652 | Legler | Mar. 29, 1949 |
| 2,517,246 | Seitz | Aug. 1, 1950 |
| 2,520,842 | Juillet | Aug. 29, 1950 |
| 2,617,877 | Delbord | Nov. 11, 1952 |
| 2,720,811 | Sziklai | Oct. 18, 1955 |